United States Patent [19]

Stoss et al.

[11] Patent Number: 4,741,364
[45] Date of Patent: May 3, 1988

[54] PILOT-OPERATED VALVE WITH LOAD PRESSURE FEEDBACK

[75] Inventors: Kenneth J. Stoss, Cedar Falls; Richard A. Felland, Waterloo, both of Iowa

[73] Assignee: Deere & Company, Moline, Ill.

[21] Appl. No.: 60,880

[22] Filed: Jun. 12, 1987

[51] Int. Cl.⁴ .................................................. F15B 13/043
[52] U.S. Cl. ............................... 137/625.64; 137/625.6
[58] Field of Search ........................ 137/625.6, 625.64

[56] References Cited

U.S. PATENT DOCUMENTS

| | | | |
|---|---|---|---|
| 3,384,102 | 5/1968 | Hickox | 137/625.64 X |
| 4,362,088 | 12/1982 | Budzich | 137/596.13 X |
| 4,494,726 | 1/1985 | Kumar et al. | |
| 4,576,200 | 3/1986 | Janecke et al. | |

FOREIGN PATENT DOCUMENTS 2102158  1/1983  United Kingdom ........... 137/625.64

OTHER PUBLICATIONS

Cox, Craig, "Electronic Control of a Modulated Torque Converter", date unknown, but prior to applicants' invention.

Patel, Kishor, "Pulse-With Modulated Proportional Flow Control", 1984.

Jacobson, L. J., "Some Practical Considerations in the Application of Proportional Electro-Hydraulic Pilot Valves.

Primary Examiner—Gerald A. Michalsky

[57] ABSTRACT

A pilot-operated electrohydraulic valve has a pilot valve member exposed to load pressure via a load pressure feedback passage. Part of the pilot valve member forms a feedback valve which closes communication through the feedback passage upon a predetermined movement of the pilot valve so that the pilot valve can be fully opened without having to overcome the load pressure which would otherwise act on the pilot valve.

13 Claims, 3 Drawing Sheets

U.S. Patent May 3, 1988 Sheet 3 of 3 4,741,364
Fig. 4
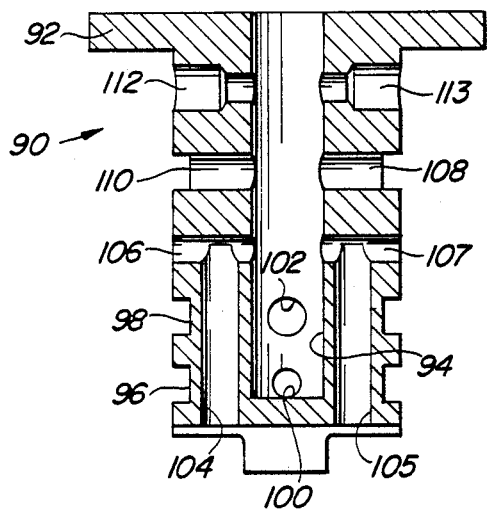
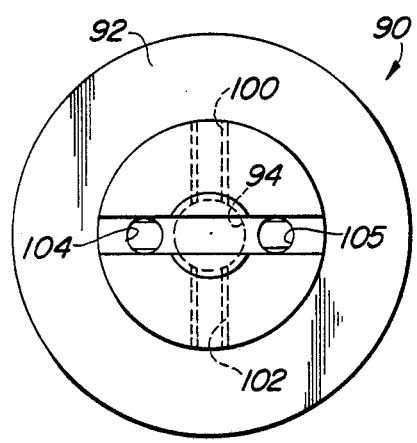
Fig. 5
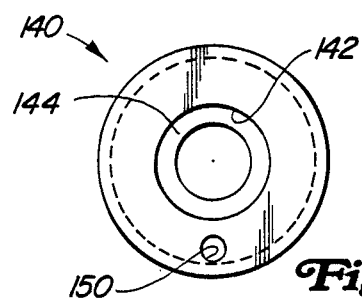
Fig. 6
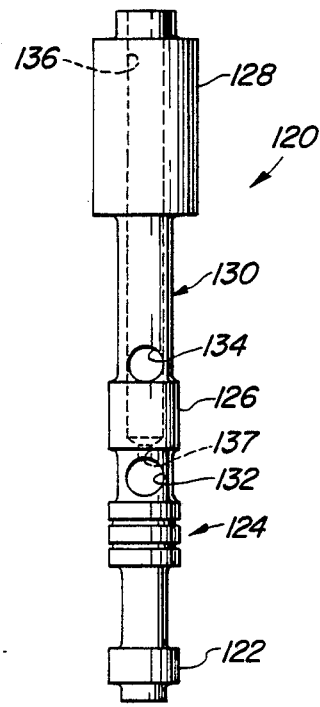
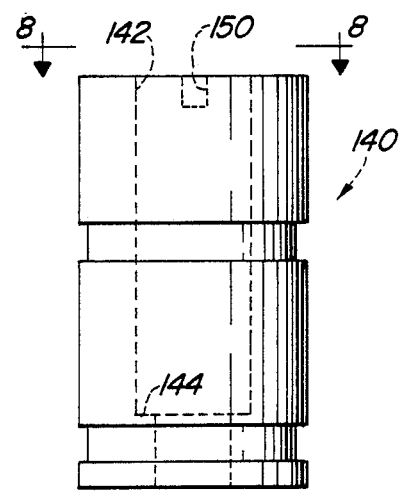
Fig. 8   Fig. 7

PILOT-OPERATED VALVE WITH LOAD PRESSURE FEEDBACK

BACKGROUND OF THE INVENTION

The present invention relates to a hydraulic control valve, and more specifically, to an electrohydraulic, pilot-operated control valve.

Because of improved cost effectiveness and performance, use of electrohydraulic control valves is increasing. One application for such valves is in the electrohydraulic controls for a vehicle transmission. Such an application requires that the valve have the ability to supply full system pressure when commanded and to compensate for changes in oil viscosity and for changes in supply pressure. Such a valve should also preferably have stability when supplying less than full pump pressure. Such a valve should also preferably connect its load port to sump when no electrical current is supplied to its solenoid.

SUMMARY OF THE INVENTION

An object of the present invention is to provide a current controlled, proportional electrohydraulic valve which has stability when providing less than full pump or supply pressure.

Another object of the present invention is to provide such a valve which, when fully open, provides full system pressure to its load.

A further object of this invention is to provide such a valve which can compensate for changes in hydraulic oil viscosity and for changes in supply pressure.

These and other objects are achieved by the present invention which has a main spool movable in a housing to control communication between a load port, a pump port and a sump port. The main spool is movable under the influence of a pilot pressure controlled by a solenoid-operated pilot valve. A feedback passage communicates load pressure to the pilot valve for stability. The pilot valve closes the feedback passage upon a certain motion of the pilot valve to minimize pressure drop between the pump and load ports when the pilot valve and the main spool are moved to fully open communication between the pump and load ports. The closed feedback passage also reduces leakage because the feedback path is closed and the main spool blocks the load to return.

BRIEF DESCRIPTION OF THE DRAWINGS

FIG. 4 is a sectional view of the pilot valve housing of the present invention.

FIG. 5 is an end view of the pilot valve housing of the present invention.

FIG. 6 is a view of the pilot valve member of the present invention.

FIGS. 7 and 8 are side views and end views, respectively, of the armature of the present invention.

DETAILED DESCRIPTION

Figure 1:
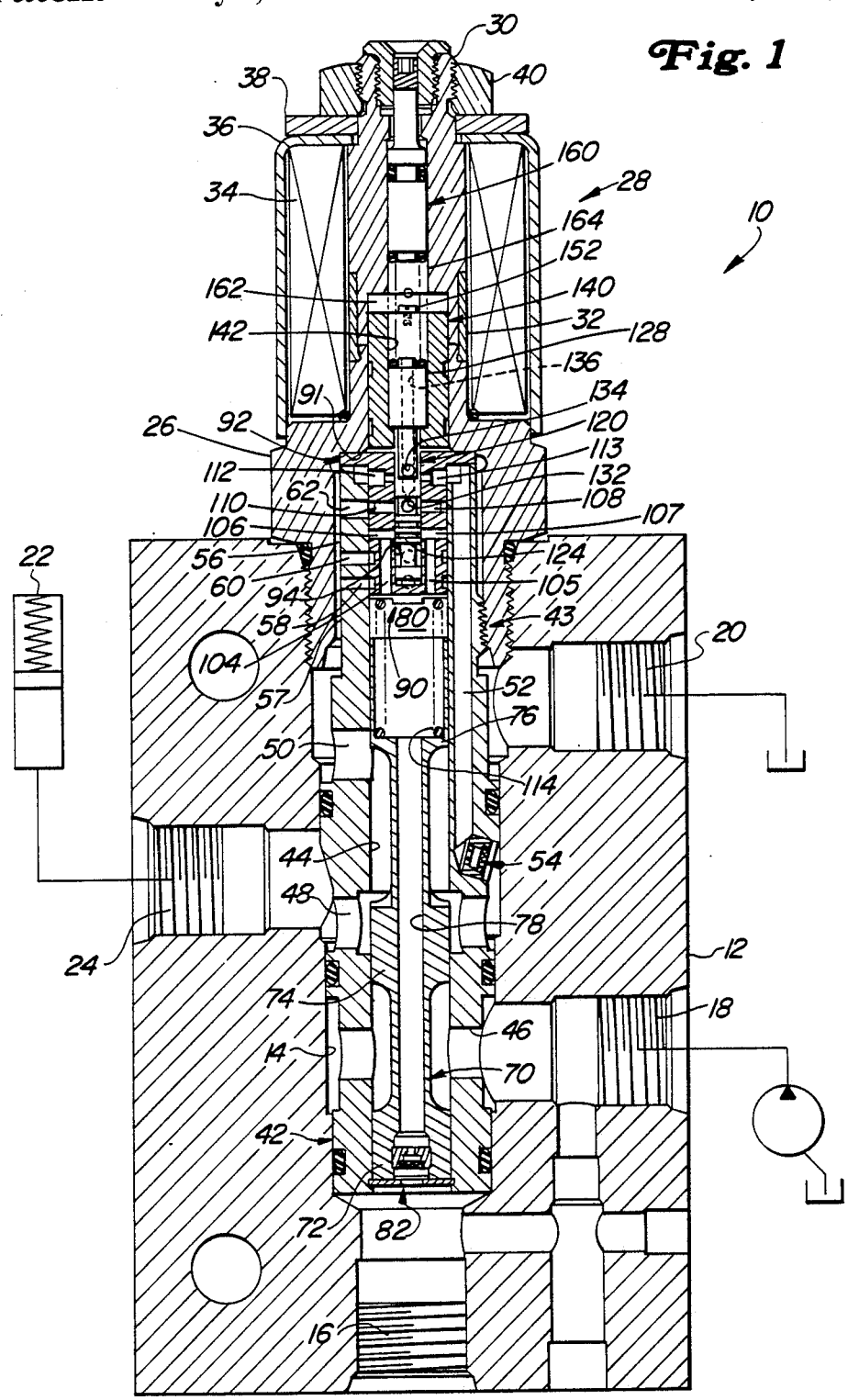
FIG. 1 is a partially sectioned view of an electrohydraulic valve constructed according to the present invention.
Figure 2:
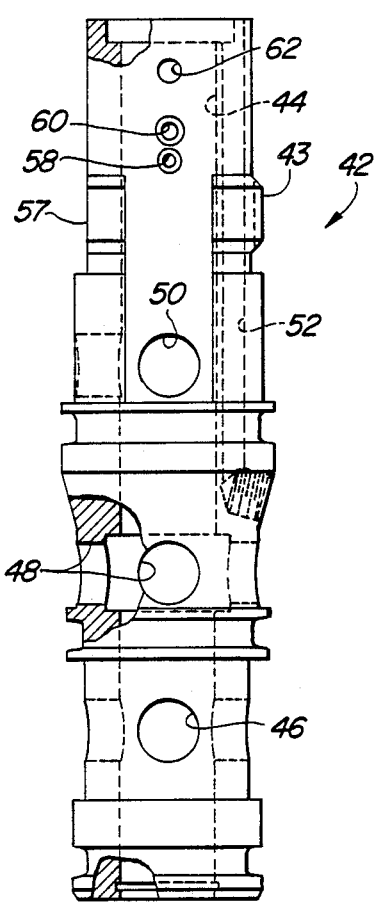
FIG. 2 is a partially sectioned view of the valve sleeve of the present invention.

The valve 10 has a housing or manifold 12 which includes a bore 14 extending therein. The bore 14 is communicated with a source of hydraulic pressure via a pilot supply port 16 and a load supply port 18. The pilot supply port 16 and load supply port 18 can be connected to the same source. However, some applications require that the pilot supply port and load supply port be kept separate. The bore 14 is communicated with a reservoir via sump or return port 20 and with a load or fluid motor 22 via load port 24.

One end of the valve bore threadably receives a hollow armature housing base 26 which supports a solenoid assembly 28. The solenoid assembly 28 includes an armature housing cap 30, an armature bushing 32, a solenoid coil 34 and a cover 36 which is retained by a washer 38 and nut 40.

The housing 12 and the base 26 receive a hollow valve sleeve 42 through which extends a valve bore 44. The sleeve 42 is threadably fixed to the armature housing 26 by threaded flange 43. A radial passage 46 communicates bore 44 with load supply port 18. Radial load passage 48 communicates bore 44 with load port 24. Radial passage 50 communicates bore 44 with return port 20.

A pilot feedback passage 52 extends generally axially through valve sleeve 42 and communicates the load port 24 with the end of sleeve 42 opposite pilot supply port 16. Preferably, a filtered orifice 54 is received within the pilot feedback passage 52. An annular cylindrical space 56 separates a portion of the valve sleeve 42 and the armature base 26. A flat 57 on one side of flange 43 (or alternatively on both sides) permits communication of space 56 with the return port 20. Axially spaced radial ports 58, 60 and 62 communicate the valve bore 44 with the annular space 56 and help to minimize the internal interaction of the valve in response to fluctuation of the return pressure.

Figure 3:
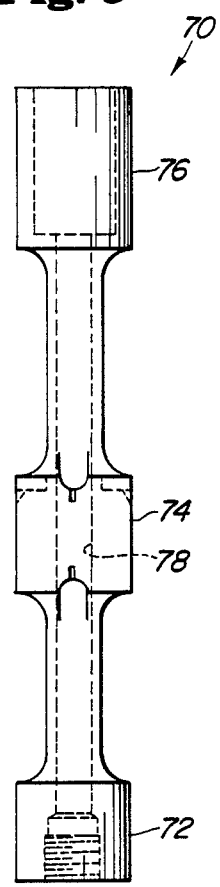
FIG. 3 is a view of the main valve member of the present invention.

The sleeve 42 slidably and sealingly receives a hollow valve member 70 which has lands 72, 74 and 76. A pilot supply passage 78 extends through valve member 70 and communicates pilot supply port 16 with a pilot chamber 80 adjacent land 76. Movement of land 74 controls communication between the load port 24 and the return port 20 and between load port 24 and the load supply port 18. Preferably, a filtered orifice 82 is received within pilot supply passage 78. A plurality of notches (best seen in FIG. 3) on land 74 provides a smooth flow control characteristic.

The sleeve 42 and the armature base 26 receive a hollow cylindrical pilot valve housing 90 which has a flange 92 at one end for sealing engagement with an annular shoulder 91 on the armature base 26 and an end of sleeve 42. A blind bore 94 extends axially into the housing 90 from the flange 92. A pair of annular grooves 96 and 98 are communicated with radial ports 58 and 60, respectively. A pair of radial passages 100 and 102 communicate bore 94 with grooves 96 and 98, respectively. The pilot chamber 80 is communicated with the bore 94 by axial passages 104, 105 and corresponding radial passages 106, 107. The bore 94 is communicated with radial port 62 via radial passage 108 and annular groove 110. The bore 94 is communicated with the pilot feedback passage 52 via radial ports 112, 113.

A spring 114 is located in the pilot chamber 80, engages the housing 90 and the valve member 70, and urges the valve member 70 away from housing 90 to a position wherein the load port 24 is communicated with the return port 20 and wherein communication is blocked between the load port 24 and the load supply port 18.

A pilot valve member 120 is received within the armature base 26 and is slidably received within the bore 94 of the pilot valve housing 90. Member 120 includes land 122, land 124 (with balancing grooves), and lands 126 and 128 connected by shaft 130. A radial passage 132 extends through shaft 130 between lands 124 and 126. A radial passage 134 extends through shaft 130 between lands 126 and 128. An axial bore 136 extends from passages 132 and 134 to an end of shaft 130 near land 128. A reduced diameter portion of bore 136 forms a flow restriction or orifice 137 between radial passages 132 and radial passages 134.

A hollow, generally cylindrical armature 140 is slidable within the solenoid assembly 28 in feedback chamber 162. A stepped bore 142 extends through armature 140 and forms shoulder 144. The land 128 of pilot valve member 120 is received in the larger diameter portion of bore 142 and engages shoulder 144. A threaded hole 150 receives a spacer screw 152. Armature 140 has two annular grooves to accept Teflon glide rings (not shown). The glide rings are to help hold the armature more concentric in the solenoid bore and thus reduce magnetic sideloading. The Teflon rings also help reduce the sliding friction when the armature moves in the bore.

An adjustment piston 160 is received in the cap 30. Piston 160, cap 30, bushing 32, base 26, pilot valve housing 90 and the pilot valve member 120 cooperate to enclose a feedback chamber 162. The armature 140 is positioned in the feedback chamber 162. A pilot spring 164 is also located within chamber 162 between piston 160 and land 128 of pilot valve member 120, and is partially received by armature 140.

Mode of Operation

When the coil 34 is not energized and the valve 10 is in the position shown in FIG. 1, the pressure in pilot chamber 80 will be equal to the supply pressure because supply port 16 is communicated with pilot chamber 80 via filtered orifice 82 and passage 78.

Also, in this unenergized condition, the load port 24 is communicated with feedback chamber 162, filtered orifice 54, pilot feedback passage 52, radial passages 112, 113, radial passage 134 and axial bore 136 and bore 142.

When the coil 34 is energized, the armature 140 and the pilot valve member 120 move away from main valve member 70. When land 124 of pilot valve member 120 moves past the edge of radial passages 106, 107, then the pilot chamber 80 will be communicated with return port 20 via axial passages 104, 105, radial passages 106, 107, bore 94, radial passage 102, annular groove 98, radial passage 60, annular space 56 and flat 57. This lowers the pressure in pilot chamber 80 and causes the main valve member 70 to move upwardly, viewing FIG. 1, to open communication between the load port 24 and supply port 18 and to close communication between load port 24 and the return port 20.

Communication remains open between load port 24 and feedback chamber 162 during the first portion of movement of pilot valve member 120. This pressure feedback feature compensates for changes in oil viscosity and for fluctuations in supply pressure. Also, the pilot valve is referenced to the sump pressure via 57, 56, 58, 100 and the bottom end of 120. This reference gives the valve a point from which to make adjustments.

However, when full load pressure is desired, the pilot valve member 120 will move further upwards viewing FIG. 1 until land 126 moves across and blocks radial passages 112, and 113, thus blocking communication between load port 24 and feedback chamber 162. This reduces the pressure in chamber 162 because chamber 162 is communicated with return port 20 via annular space 56, radial port 62, radial passages 108 and 110, radial passage 132, orifice 137 and axial bores 136, and 142. This lower return pressure in chamber 162 allows solenoid coil 34 to fully raise armature 140 and pilot valve 120, thus fully raising main valve member 70 and fully opening communication between supply port 18 and load port 24.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:
1. A valve comprising:
 a housing having a valve bore therein, and having a supply port communicating the valve bore with a pressure source, a return port communicating the valve bore with a reservoir and a load port communicating the valve bore with a hydraulic load;
 a pressure-operated main valve member movable in the valve bore to control fluid communication between the load port and the supply and return ports;
 a pressure-responsive pilot valve member movable to control a pilot pressure communicated to the main valve member;
 a load feedback passage communicating fluid pressure from the load port to the pilot valve; and
 feedback valve means for opening and closing fluid communication through the load feedback passage.
2. The valve of claim 1, wherein:
 the feedback valve closes the load feedback passage upon a predetermined motion of the pilot valve member.
3. The valve of claim 1, wherein:
 a portion of the load feedback passage extends through a portion of the pilot valve member.
4. The valve of claim 1, wherein:
 the housing and the main valve member form a pilot chamber; and
 the housing and the pilot valve member form a feedback chamber, the feedback passage communicating fluid pressure from the load port to the feedback chamber.
5. The valve of claim 4, further comprising:
 a return feedback passage communicating the return port with the feedback chamber.
6. The valve of claim 5, wherein:
 a portion of the return feedback passage extends through the pilot valve member.
7. The valve of claim 5, comprising:
 a pilot valve housing having a pilot valve bore therein, a first port communicated with the pilot valve bore, the pilot valve bore and the first port forming a portion of the load feedback passage, and a second port communicated with the pilot valve bore, the pilot valve bore and the second port forming a portion of the return feedback passage; and the pilot valve member being movable in the pilot valve bore and having an axial passage therein communicated at one end with the feedback chamber, having a first radial port intersecting the axial passage and forming a portion of the load feedback passage, having a second radial port intersecting the axial passage and forming a portion of the return feedback passage, and having a land between the first and second radial ports, the land cooperating with a wall of the pilot valve bore to open and close communication between the first port of the pilot valve housing and the first radial port of the pilot valve member.

8. The valve of claim 7, wherein:

the axial passage has a reduced diameter section which comprises a flow restrictor between the second radial port and the feedback chamber.

9. A valve comprising:

a housing defining a valve bore therein, a supply port communicating the valve bore with a pressure source, a return port communicating the valve bore with a fluid reservoir, and a load port communicating the bore with a load;

a main valve member received in the valve bore, the main valve member and the housing cooperating to define a pilot chamber, the main valve member being movable in response to changes in fluid pressure in the pilot chamber to control fluid communication between the load, return and supply ports;

a pilot supply passage communicating the supply port with the pilot chamber;

a pilot return passage communicating the return port with the pilot chamber;

a pilot valve member movable in the housing to control fluid communication between the pilot chamber and the return pilot passage, the pilot valve member and the housing cooperating to define a feedback chamber, fluid pressure in the feedback chamber urging the pilot valve member in a direction closing communication between the pilot chamber and the return pilot passage;

a feedback passage communicating the load port with the feedback chamber; and feedback valve means for controlling fluid communication through the feedback passage.

10. The valve of claim 9, wherein:

the feedback valve means blocks the feedback passage upon at least a predetermined movement of the pilot valve member in the direction opening communication between the pilot chamber and the pilot return passage.

11. The valve of claim 9, wherein:

at least a portion of the feedback passage extends through at least a portion of the pilot valve member.

12. The valve of claim 9, further comprising:

at least a portion of the feedback passage extending through a portion of the housing.

13. A valve comprising:

a housing having a valve bore therein, and having a supply port communicating the valve bore with a pressure source, a return port communicating the valve bore with a reservoir and a load port communicating the valve bore with a hydraulic load;

a pressure-operated main valve member movable in the valve bore to control fluid communication between the load port and the supply and return ports;

a pilot valve movable to control a pilot pressure communicated to the main valve member;

means for sensing fluid pressure in the load port and for influencing movement of the pilot valve as a function of the sensed load port pressure so as to compensate for changes in fluid viscosity and pressure of the pressure source; and means for cancelling the effect of the feedback means when the pilot valve is moved to cause the main valve member to maximize pressure at the load port.

* * * * *